United States Patent
Smida

(10) Patent No.: US 9,774,479 B2
(45) Date of Patent: Sep. 26, 2017

(54) COMMUNICATING DATA USING BACKSCATTER MODULATION

(71) Applicant: Purdue Research Foundation, West Lafayette, IN (US)

(72) Inventor: Besma Smida, Munster, IN (US)

(73) Assignee: PURDUE RESEARCH FOUNDATION, West Lafayette, IN (US)

( * ) Notice: Subject to any disclaimer, the term of this patent is extended or adjusted under 35 U.S.C. 154(b) by 100 days.

(21) Appl. No.: 14/609,468

(22) Filed: Jan. 30, 2015

(65) Prior Publication Data

US 2015/0236841 A1 Aug. 20, 2015

Related U.S. Application Data

(60) Provisional application No. 61/933,362, filed on Jan. 30, 2014.

(51) Int. Cl.
*G05B 19/00* (2006.01)
*H04L 27/00* (2006.01)

(52) U.S. Cl.
CPC .................................. *H04L 27/00* (2013.01)

(58) Field of Classification Search
CPC ...... H04L 27/2627; H04L 27/04; H04L 27/20; H04L 27/365
USPC ............................................... 340/10.1, 5.61
See application file for complete search history.

(56) References Cited

U.S. PATENT DOCUMENTS

| | | | | |
|---|---|---|---|---|
| 2005/0242927 A1* | 11/2005 | Friedrich | ............ | G06K 7/10019 340/10.2 |
| 2007/0096873 A1* | 5/2007 | Sadr | ..................... | G06K 7/0008 340/5.61 |
| 2013/0169467 A1* | 7/2013 | Iagounov | ................ | G01S 13/04 342/27 |
| 2014/0133530 A1* | 5/2014 | Maguire | .................. | H04B 1/38 375/219 |

OTHER PUBLICATIONS

Boyer, C. et al., Coded QAM Backscatter Modulation for RFID. IEEE Transactions on Communications, vol. 60, No. 7, 1925-1934 (2012).
Chakraborty, R., et al., Revisiting RFID Link Budgets for Technology Scaling: Range Maximization of RFID Tags. IEEE Transactions on Microwave Theory and Techniques, vol. 59, No. 2, 496-503 (2011).
Stockman, H., Communication by Means of Reflected Power. Proceedings of the I.R.E. vol. 36, 1196-1204 (1948).

\* cited by examiner

*Primary Examiner* — Charles C Jiang
*Assistant Examiner* — Will Lin
(74) *Attorney, Agent, or Firm* — Purdue Research Foundation

(57) ABSTRACT

A system and method for full duplex wireless communication is disclosed. The system utilizes backscatter modulation of a first signal received by a guest device from a basestation to transmit a guest device message to a host basestation. The guest device utilizes the same antenna to both receive and transmit message signals.

18 Claims, 4 Drawing Sheets

COMMUNICATING DATA USING BACKSCATTER MODULATION

RELATED APPLICATIONS

The present application claims the benefit of U.S. provisional application Ser. No. 61/933,362, filed Jan. 30, 2014, the contents of which are hereby incorporated by reference in its entirety.

TECHNICAL FIELD

The present application relates to data communications, and particularly to wireless communications.

BACKGROUND

Given the ever-increasing demand for high-speed data services, modern wireless networks will increasingly require more efficient strategies for use of the available frequency spectrum, which is likely to be among the key rate-limiting factors for effectively meeting this increased demand. One key limit to spectrum utilization efficiency involves the current practice of half duplex RF communication, in which a node either transmits or receives a signal in a single channel usage. Furthermore, communication is often asymmetrical and is becoming more so over time. From the view point of traffic symmetry between uplink (mobile to base-station) and downlink (base-station to mobile), data traffic started as highly symmetrical with voice services. Over time, however, it has become markedly imbalanced, with the major growth of new multimedia services being characterized by asymmetric traffic (much higher downlink). Overall traffic patterns are also becoming more asymmetrical because the largest bandwidth demand currently derives from downstream TV and Internet video signals.

It is therefore desired to increase the spectrum efficiency of such RF systems. Full duplex, in which a node can transmit and receive on the same frequency at the same time, is also desirable. However, transmitting a high-power signal from the same station that is receiving a low-power signal increases self-interference, making it difficult to distinguish the low-power signal from noise or from the high-power signal.

RFID backscatter modulation has been used to permit the same antenna to transmit data using a received un-modulated carrier. However, RFID is generally limited to low-power operation and is generally only half-duplex.

There is, therefore, a need of an improved way of performing data communications.

SUMMARY

Various aspects of the present disclosure provide a method of communicating data, the method comprising: using a transmitter, transmitting a first modulated data signal (e.g., PSK, ASK, or another modulation) corresponding to a first symbol stream (e.g., a bit stream); using a transceiver, backscatter-modulating the first modulated data signal according to a second symbol stream (e.g., a bitstream) to provide a second modulated data signal; receiving the second modulated data signal (a doubly-modulated carrier) using a receiver; and using a processor, automatically demodulating the second modulated data signal using the first symbol stream to determine contents of the second symbol stream. The transmitting and receiving steps can be performed on the same frequency simultaneously, permitting full-duplex communication.

According to another aspect, a system for communicating data is disclosed comprising: a base station including a transmitter, a receiver and a first processor, the transmitter configured to transmit a first modulated data signal corresponding to a first symbol stream, the receiver configured to receive a second modulated data signal, the first processor configured to automatically demodulate these second modulated data signal using the first symbol stream to determine contents of a second symbol stream; and a transceiver configured to backscatter-modulate the first modulated data signal according to the second symbol stream to provide the second modulated data signal to the receiver.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

The attached drawings are for purposes of illustration and are not necessarily to scale.

DETAILED DESCRIPTION

In the following description, some aspects will be described in terms that would ordinarily be implemented as software programs. Those skilled in the art will readily recognize that the equivalent of such software can also be constructed in hardware, firmware, or micro-code. Because data-manipulation algorithms and systems are well known, the present description will be directed in particular to algorithms and systems forming part of, or cooperating more directly with, systems and methods described herein. Other aspects of such algorithms and systems, and hardware or software for producing and otherwise processing the signals involved therewith, not specifically shown or described herein, are selected from such systems, algorithms, components, and elements known in the art. Given the systems and methods as described herein, software not specifically shown, suggested, or described herein that is useful for implementation of any aspect is conventional and within the ordinary skill in such arts.

Steps of methods or computer programs described herein can be performed in any order except when otherwise specified, or when data from an earlier step is used in a later step. For clarity of explanation, reference is herein made to various components that can carry out or participate in steps of exemplary method(s) or computer program(s). It should be noted, however, that other components can be used; that is, exemplary method(s) or program(s) are not limited to being carried out by identified component(s).

As used here, the term "guest" refers to the peer in a communication that is using backscatter modulation, e.g., a mobile station such as a cellular telephone. The term "host" refers to the other peer, e.g., a cellular base station, which performs demodulation of the backscatter-modulated signal. In various aspects, the guest (mobile device or other remote station) is using backscatter modulation so does not have to deal with self-interference. Multiple antennas can be used by the host or the guest. Various aspects can be used to communicate data indoors or outdoors.

At the host, the main carrier provides self-interference. Transmit (TX) and receive (RX) antennas can be spaced apart to reduce the effects of self-interference.

The guest modulates an already-modulated carrier. E.g., network coding can be used: for a 0 bit in a bit stream, reflect the incident carrier unchanged; for a 1 bit in the bit stream, reflect the incident carrier reversed in, e.g., polarity or phase. The base station can then XOR the transmitted data stream with the received data stream to determine the data. The host can time-shift the transmitted stream to align with the received stream before the XOR. The host can measure round-trip time of, e.g., a predetermined bit pattern to determine the required time shift.

Figure 1:
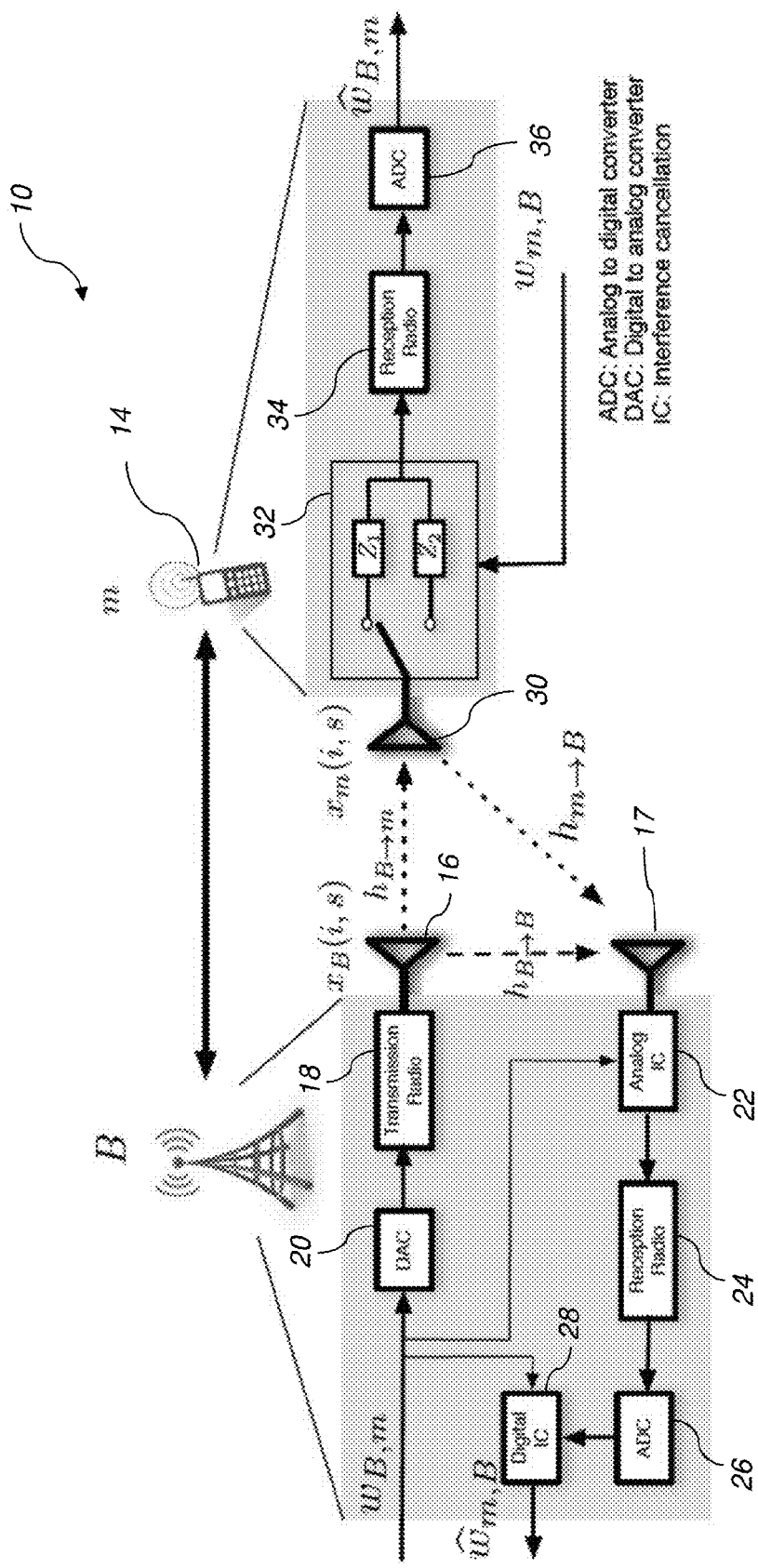
FIG. 1 is a high-level diagram showing components of a system for full duplex wireless communication using backscatter modulation according to one embodiment.

FIG. 1 illustrates an exemplary system 10 for transmitting data (binary, quaternary, or other size symbols). As shown, the system 10 includes a central node, such as base station 12 and an end user 14 which are in operative communication over a wireless network. The base station 12 may include, for example, a first antenna 16, a second antenna 17, a transmission radio 18, a digital to analog converter ("DAC") 20, an analog interference cancellation ("IC") unit 22, a reception radio 24, an analog to digital converter ("ADC") 26, and a digital interference cancellation unit 28 operatively connected as shown. The end user 14 (e.g., a cellular telephone) may include an antenna 30, a modulator circuit 32, a reception radio 34, and an ADC 36 operatively connected as shown. It shall be understood that the system 10 may include additional circuitry or components.

The end-user 14 has an independent message $w_{m,B}$ destined for the base station 12; and the base station has an independent message $w_{B,m}$ destined for end-user 14. For the system 10, it is assumed that both the base-station 12 and each end-user 14 transmit and receive simultaneously using exactly the same frequency band. It is also assumed that the channel outputs are linear combinations of the transmitted signals scaled by the channel gains plus independent additive white Gaussian noise. The channel gains $h_{B \to m}$, $h_{m \to B}$ and $h_{B \to B}$ are assumed to be unknown complex numbers distributed according to a known distribution.

The DAC 20 includes modulation, e.g., for BPSK. $x_B$ is the transmitted waveform (from base station to end user). E.g., an RF carrier modulated according to $h_{B \to m}$ is the distortion of channel. The received signal at the end user 14 is $x_m = x_B * h_{B \to m} + \text{noise}$.

Self-interference correction can be performed in the analog domain (by analog IC unit 22), the digital domain (by digital IC unit 28), or both. For example, the XOR for decoding the network coding can be performed in the digital IC unit 28.

To determine channel characteristics h, known training protocols and methods can be used, e.g., channel estimation techniques known in the art. Specific bits can be sent by the host and reflected unchanged by the guest; the base station estimates round-trip time from those. The guest can make its own estimate of $h_{B \to m}$. The host and guest can communicate h information with each other.

The system 10 provides benefits over prior art full-duplex systems by utilizing a framework which (a) utilizes a backscatter modulation approach, (b) provide data flow in two directions using the same carrier, and (c) employing analog network coding and interference cancellation during transmission.

Forward Link—Free of Self-Interference to Accommodate High Downlink Traffic:

The base-station 12 carries out a digital to analog conversion using DAC 20 and sends the resulting symbol sequence to the transmission radio 18. In FIG. 1 signal $x_B$ (i, s) denotes the i-th symbol transmitted from the base-station 12 during the frame, or packet s. A "packet" consists of T consecutive transmitted symbols. We define $x_B(i, s) = [E(s)]^{1/2} s_B(i,s)$ where $s_B$ (i, s) is the transmitted constellation symbol normalized to unit energy and E(s) denotes the average symbol energy during s packet. At the end-user, the antenna 30 receives and scatters back at the same time.

Figure 2:
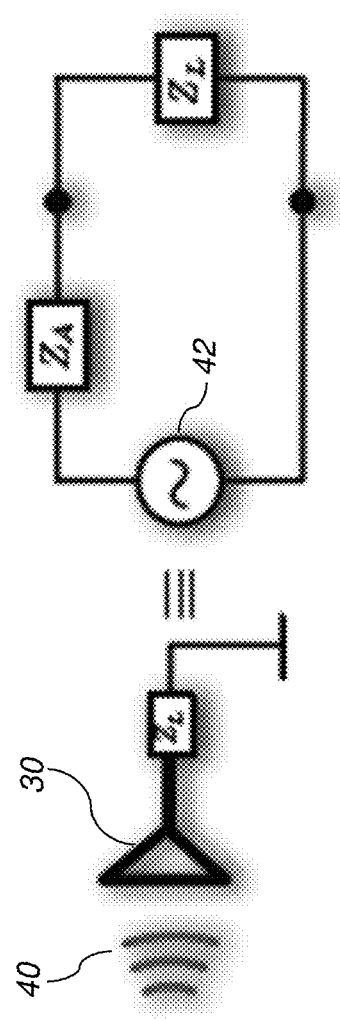
FIG. 2 is a schematic of an equivalent circuit for a receiving antenna according to one embodiment.

To illustrate how the received signal is simply reflected back out of the same antenna that receives it, the Thevenin equivalent circuit shown in FIG. 2 is used. In simple terms, an electromagnetic wave 40 impinges on an antenna 30 and excites a current 42. The current waveform propagates along the transmission line connected to the antenna 30 and reflects off the load impedance $Z_A$. The reflected current waveform propagates back toward the antenna and is reradiated. In the static case, where the load impedance remains constant, the reradiated wave has the same frequency as the original impinging wave, but with a phase offset caused by the load. However, when the load is allowed to change, this setup is capable of modulating data upon the original waveform, which can be received and decoded. Note that for maximum power reception the input impedance of the receiving antenna should be conjugate matched to that of the load ($ZL = Z^*_A$). On the other hand, the base-station receiver will be able to demodulate correctly only when the difference between the backscattered waves is sufficiently large. Therefore, a load-impedance design should continuously provide sufficient power for the demodulator while exhibiting maximal difference in the backscattered field. The received signal at the end-user, $y_m(i, s)$, is given by $$y_m(i,s) = \xi(Z_{i,s}) h_{B \to m}(i,s) x_B(i,s) + w_m(i,s), \quad (1)$$

where $\xi(Z i,s)$ is the power transfer coefficient at load impedance Zi,s (defined as the power received normalized by the power received at matched load), wm(i, s) is additive white Gaussian noise (AWGN), and the channel gain $h_{B \to s}(i, s)$ is a time-varying random variable. We define $\Psi_{B \to m}(s) = E[|h_{B \to m}(i,s)|^2]$, which depends on gains of antennas, polarity mismatch, the distance between the base-station and end-user, and carrier wavelength. Contrary to prior-art full-duplex wireless networks that are predicated upon the principle that the base-station and the end-user must generate their own radio-carrier waves independently and hence both have to deal with very high self-interference, using the system 10 the end-user 14 will receive a self-interference-free signal. The base-station to end-user link is, therefore, similar to the conventional half-duplex transmission. The end-user can extract its own message $\hat{w}_{B,m}$ using conventional reception radio and analog to digital conversion (ADC). This will guarantee a very high data-rate toward the end-user and will be able to efficiently accommodate high downlink traffic.

Backscatter Link—Power Derived from the Received Transmission:

During backscatter operation, the base-station 12 transmits a modulated carrier wave that illumi-nate the end-user antenna 30 with an electromagnetic (EM) field. Corresponding to the physical properties and impedance loading of the end-user antenna 30, a portion of the impinging EM wave will be backscattered from the end-user 12. By choosing from a set of impedance loadings, the end-user 14 can map a sequence of digital symbols onto the backscattered waveforms. More specifically, the backscattered signal is comprised of two components: a) a structural mode scattering and b) an antenna mode scattering. Structural mode scattering depends on the physical properties of the antenna $A_s$, whereas antenna mode scattering depends on the antenna's impedance load $\Gamma(Zi,s)$. Consequently, the signal backscattered from the end-user can be represented as:

$$x_m(i,s) = (A_s - \Gamma(Z_{i,s})h_{B \to m}(i,s)x_B(i,s) \qquad (2)$$

where $$\Gamma(Zi, s) = \frac{Z_{i,s} - Z^*_{ant}}{Z_{i,s} + Z_{ant}}$$

and $Z_{ant}$ is the input impedance of the antenna. s represents the packet number, i the symbol number in the packet. Term $x_B$ is the signal transmitted by the host. The network coding is represented by the $(A_s - \Gamma)$ term. $A_s$ is a property of the antenna, usually 1.0. $Z_{ant}$ is constant. $Z_{i,s}$ is the impedance corresponding to bit (or symbol) i of packet s. For a binary system, this term represents reversing the phase between +1 and −1 depending on the bit to be transmitted. The channel is h. To receive data $Z_{i,s}$, the base station 12 removes the known $x_B$, performs channel equalization to remove h, then undoes the $A_s - \Gamma$ (or other coding scheme) term to determine $Z_{i,s}$. In this framework, we consider PSK modulation, so the backscattered signal becomes a network-coded combination of the messages sent by the end-user 14 and the base-station 12.

Because of leakage from the transmitting antenna, the signal received at the base-station 12 is given by $$y_B(i,s) = h_{m \to B}(i,s)x_m(i,s) + h_{B \to B}(i,s)x_B(i,s)w_B(i,s) \qquad (3)$$

where $h_{m \to B}(i, s)$ is the time-varying signal amplitude loss due to propagation from the end-user 14 to the base-station 12. We define $\Psi_{m \to B}(s) = E[|hm \to B(i, s)|^2]$. We use $h_{B \to B}(i, s)$ to denote the wireless self-interference at the base station and model this channel as a random variable. At the first stage, since the base station "knows" the strong self-interference signal it is sending $x_B(i,s)$, it can extract the backscattered signal after correcting for channel effects. The base station is left with the backscattered signal $x_m(i, s)$ that is a function of both the messages sent by end-user and base-station. Then at the second stage, knowing the message that was initially sent, the base-station can extract its own message $\hat{w}_{m,B}$. If PSK modulation is used at the base-station and at the end-user, the backscattered signal—a network-coded combination of the messages sent by the end-user and the base-station—can be decoded by the base-station.

Put another way, the base station 12 performs computations starting from equation (3) for $y_B(i,s)$ to determine $x_m(i,s)$. In various aspects, the base station performs self-interference cancellation and channel equalization to remove the $h_{B \to B}(i,s) x_B(i,s)$ term. After that the base station performs a channel equalization to find $x_m(i,s)$.

Full-Duplex BM Communication: Power Tradeoffs:

Full-duplex BM setting is different from conventional setting in which a total power is imposed on the two nodes. Indeed, the end-user has no power available for transmission besides the received transmission power. This guarantees a high data-rate in the forward link, but it limits the backscatter link range and data-rate. In addition, since the load is allowed to change, the receiving antenna is not conjugate matched to that of the load. A modulation-impedance design should provide sufficient power for the demodulator while exhibiting maximal difference in the backscattered field. To analysis these, a circuit model is utilized that captures the tradeoff power between demodulation and modulation. Then, an optimization method is derived and numerically evaluated.

Figure 3:
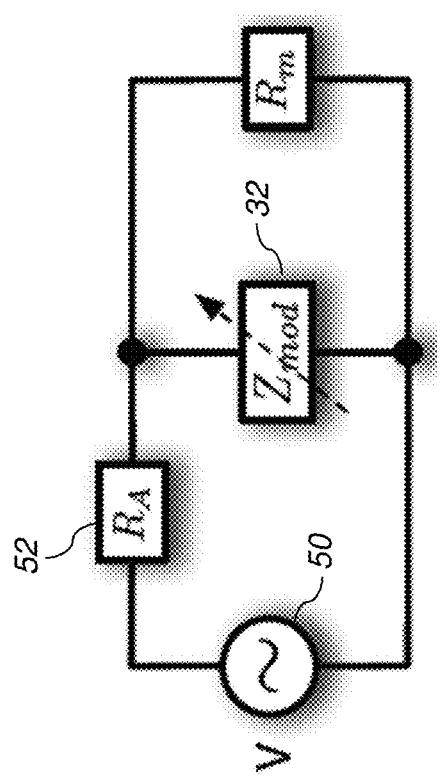
FIG. 3 is s schematic of an equivalent circuit for an end-user's antenna and integrated components according to one embodiment.

To accomplish the above, a Thevenin equivalent model for the antenna 30 and all of the integrated-circuit components of the end-user 14, as depicted in FIG. 3, is utilized. The antenna 30 is represented by a voltage source 50 in series with resistance 52 ($R_A$). V is the voltage generated by the base-station's electrical field at the end-user antenna 30. The variable $Z_{mod}$ represents the modulation circuit 32 and is controlled by the end-user micro-controller. The input impedance of all of the end-user's integrated circuit components, except the modulator circuit 32, is modeled by $R_m$. Impedance-matching between the integrated circuits and the antenna is assumed to simplify the circuit. The power delivered to $R_m$ is the power available for the demodulation at the end-user 14. The value of $R_m$ is chosen to equal $R_A$ so that when $Z_{mod} = 0$, the maximum amount of power transferred from the antenna to the integrated circuit components is given by $$P_{match} = \frac{|V|^2}{8R_{ant}}.$$

In view of the foregoing, various aspects provide improved communication of data without some of the negative effects of self-interference. In various aspects, the guest does not have any self-interference problems since it does not provide active transmission power that might interfere with the receiver. The host has improved compensation for self-interference since it knows the nature of the transmitted signal. A technical effect is to transmit radio-frequency or other wireless signals.

Table 1 shows simulated examples of ergodic capacity in bits/Hz/second vs. the distance in meters over which data are transmitted using the system 10. "Half-duplex" is a conventional technique that uses either two time-slots or two frequency-bands to achieve bi-directionality (one slot or band for TX and one for RX). "Full-duplex" data correspond to an exemplary aspect described herein using backscatter modulation of an already-modulated carrier to transmit data between the guest and the host simultaneously. In Table 1, "IC" is the level of self-interference cancellation at the base station (in dB). Lower IC values can correspond to less expensive host hardware or reduced separation between TX and RX antennas compared to higher IC values, so it is desirable to provide effective performance at low IC values. As Table 1 shows, the full-duplex systems out-perform half-duplex systems in all the conditions simulated. The full-duplex performance gains increase with the average self-interference cancellation and decrease with distance.

TABLE 1

| | | ergodic capacity, bits/Hz/s | | | |
| --- | --- | --- | --- | --- | --- |
| | | Full-duplex | | | |
| Distance (m) | Half-duplex | IC = 70 dB | IC = 90 dB | IC = 100 dB | IC = 120 dB |
| 1 | 33.7003 | 33.7925 | 35.1075 | 36.8672 | 41.2667 |
| 2 | 32.3141 | 32.3569 | 32.6078 | 33.4462 | 37.1708 |
| 3 | 31.5033 | 31.5432 | 31.6068 | 31.9602 | 34.856 |
| 4 | 30.928 | 30.9674 | 30.9889 | 31.142 | 33.3077 |
| 5 | 30.4817 | 30.521 | 30.53 | 30.6023 | 32.1971 |
| 6 | 30.1171 | 30.1564 | 30.1607 | 30.1979 | 31.3683 |
| 7 | 29.8089 | 29.8481 | 29.8505 | 29.8711 | 30.7316 |
| 8 | 29.5418 | 29.5811 | 29.5824 | 29.5948 | 30.2305 |
| 9 | 29.3063 | 29.3455 | 29.3464 | 29.3541 | 29.8271 |
| 10 | 29.0956 | 29.1348 | 29.1354 | 29.1405 | 29.4951 |
| 11 | 28.905 | 28.9442 | 28.9446 | 28.9481 | 29.2164 |
| 12 | 28.731 | 28.7702 | 28.7705 | 28.7729 | 28.9779 |
| 13 | 28.5709 | 28.6101 | 28.6103 | 28.6121 | 28.7703 |
| 14 | 28.4227 | 28.4619 | 28.4621 | 28.4634 | 28.5866 |
| 15 | 28.2847 | 28.3239 | 28.3241 | 28.3251 | 28.4221 |

Figure 4:
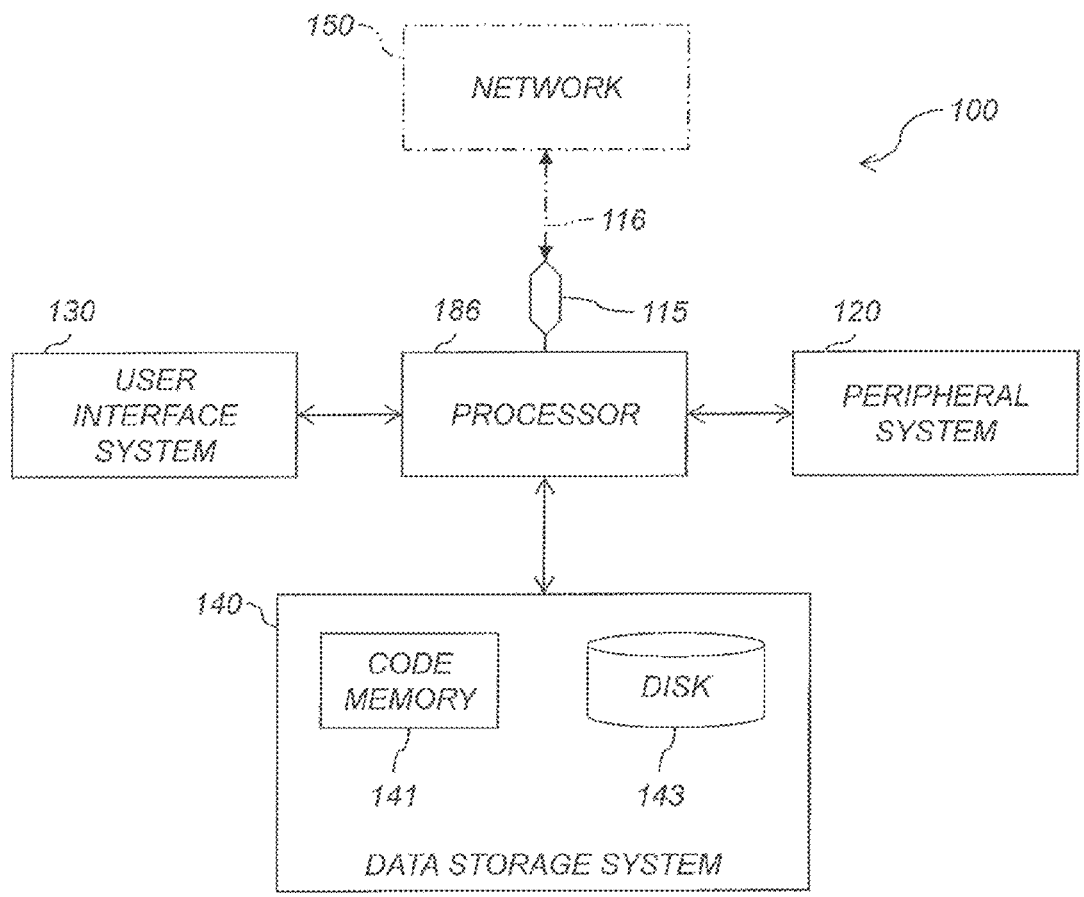
FIG. 4 is a high-level diagram showing the components of a data-processing system according to one embodiment.

FIG. 4 is a high-level diagram showing the components of an exemplary data-processing system 100 for processing data and performing other functions described herein, and related components. A host or a guest can include such a data-processing system or components thereof, in addition to the components described above with respect to system 10. The system includes a processor 186, a peripheral system 120, a user interface system 130, and a data storage system 140. The peripheral system 120, the user interface system 130 and the data storage system 140 are communicatively connected to the processor 186. Processor 186 can be communicatively connected to network 150 (shown in phantom), e.g., the Internet or an X.15 network, as discussed below. Devices described herein, e.g., hosts and guests, can each include one or more of systems 186, 120, 130, 140, and can each connect to one or more network(s) 150. Processor 186, and other processing devices described herein, can each include one or more microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs). Exemplary data-processing systems having at least some of the illustrated components can be embodied in, e.g., a desktop computer, laptop computer, mainframe computer, personal digital assistant, digital camera, cellular phone, smartphone, base station, wireless access point, or any other device for processing data, managing data, or handling data, whether implemented with electrical, magnetic, optical, biological components, or otherwise.

Processor 186 can implement processes of various aspects described herein. For example, on a guest, processor 186 and related components can perform demodulation of received data and network coding or other functions to modulate the backscattered signal to transmit data. On a host, processor 186 and related components can modulate the TX signal, receive the doubly-modulated signal from the guest, and demodulate the signal as described herein. Processor 186 can include Harvard-architecture components, modified-Harvard-architecture components, or Von-Neumann-architecture components.

The phrase "communicatively connected" includes any type of connection, wired or wireless, for communicating data between devices or processors. These devices or processors can be located in physical proximity or not. For example, subsystems such as peripheral system 120, user interface system 130, and data storage system 140 are shown separately from the data processing system 186 but can be stored completely or partially within the data processing system 186.

The peripheral system 120 can include one or more devices configured to provide digital content records to the processor 186. For example, the peripheral system 120 can include digital still cameras, digital video cameras, cellular phones, or other data processors. The processor 186, upon receipt of digital content records from a device in the peripheral system 120, can store such digital content records in the data storage system 140.

The user interface system 130 can include a mouse, a keyboard, another computer (connected, e.g., via a network or a null-modem cable), or any device or combination of devices from which data is input to the processor 186. The user interface system 130 also can include a display device, a processor-accessible memory, or any device or combination of devices to which data is output by the processor 186. The user interface system 130 and the data storage system 140 can share a processor-accessible memory.

In various aspects, processor 186 includes or is connected to communication interface 115 that is coupled via network link 116 (shown in phantom) to network 150. For example, communication interface 115 can include an integrated services digital network (ISDN) terminal adapter or a modem to communicate data via a telephone line; a network interface to communicate data via a local-area network (LAN), e.g., an Ethernet LAN, or wide-area network (WAN); or a radio to communicate data via a wireless link, e.g., WiFi or GSM. Communication interface 115 sends and receives electrical, electromagnetic or optical signals that carry digital or analog data streams representing various types of information across network link 116 to network 150. Network link 116 can be connected to network 150 via a switch, gateway, hub, router, or other networking device. Communication interface 115 can also include a radio, host or guest, as described herein.

Processor 186 can send messages and receive data, including program code, through network 150, network link 116 and communication interface 115. For example, a server can store requested code for an application program (e.g., a JAVA applet) on a tangible non-volatile computer-readable storage medium to which it is connected. The server can retrieve the code from the medium and transmit it through network 150 to communication interface 115. The received code can be executed by processor 186 as it is received, or stored in data storage system 140 for later execution.

Data storage system 140 can include or be communicatively connected with one or more processor-accessible memories configured to store information. The memories can be, e.g., within a chassis or as parts of a distributed system. The phrase "processor-accessible memory" is intended to include any data storage device to or from which processor 186 can transfer data (using appropriate components of peripheral system 120), whether volatile or non-volatile; removable or fixed; electronic, magnetic, optical, chemical, mechanical, or otherwise. Exemplary processor-accessible memories include but are not limited to: registers, floppy disks, hard disks, tapes, bar codes, Compact Discs, DVDs, read-only memories (ROM), erasable programmable read-only memories (EPROM, EEPROM, or Flash), and random-access memories (RAMs). One of the processor-accessible memories in the data storage system 140 can be a tangible non-transitory computer-readable storage medium, i.e., a non-transitory device or article of manufacture that participates in storing instructions that can be provided to processor 186 for execution.

In an example, data storage system 140 includes code memory 141, e.g., a RAM, and disk 143, e.g., a tangible computer-readable rotational storage device such as a hard drive. Computer program instructions are read into code memory 141 from disk 143. Processor 186 then executes one or more sequences of the computer program instructions loaded into code memory 141, as a result performing process steps described herein. In this way, processor 186 carries out a computer implemented process. For example, steps of methods described herein, blocks of the flowchart illustrations or block diagrams herein, and combinations of those, can be implemented by computer program instructions. Code memory 141 can also store data, or can store only code.

Various aspects described herein may be embodied as systems or methods. Accordingly, various aspects herein may take the form of an entirely hardware aspect, an entirely software aspect (including firmware, resident software, micro-code, etc.), or an aspect combining software and hardware aspects These aspects can all generally be referred to herein as a "service," "circuit," "circuitry," "module," or "system."

Furthermore, various aspects herein may be embodied as computer program products including computer readable program code stored on a tangible non-transitory computer readable medium. Such a medium can be manufactured as is conventional for such articles, e.g., by pressing a CD-ROM. The program code includes computer program instructions that can be loaded into processor 186 (and possibly also other processors), to cause functions, acts, or operational steps of various aspects herein to be performed by the processor 186 (or other processor). Computer program code for carrying out operations for various aspects described herein may be written in any combination of one or more programming language(s), and can be loaded from disk 143 into code memory 141 for execution. The program code may execute, e.g., entirely on processor 186, partly on processor 186 and partly on a remote computer connected to network 150, or entirely on the remote computer.

Compared to some prior schemes, various aspects herein advantageously improve the network performance of the physical layer in the OSI model. Schemes that attempt to improve the performance of higher layers in the OSI model (e.g., transport or application layers) will be limited by the performance the physical layer provides. Moreover, common transport layers such as TCP involve frequent bidirectional transfer of data packets (e.g., data packets and acknowledge packets, "ACKs"), so providing full-duplex communication at the physical layer advantageously improves the performance of such transport layers. Streaming of data, e.g., audio or video programs, to guest devices is also becoming common. Full-duplex transmission as described herein according to various aspects permits the guest to ACK streamed data without interrupting the flow of the streamed data from the host. This permits reducing the size of the data buffers in the host and the guest, and correspondingly reducing latency and providing an improved user experience to the user of the guest device. Various aspects herein are not limited to full-duplex transmission and can be used in a half-duplex mode, e.g., with an unmodulated carrier or a carrier modulated according to a training pattern or other known bit stream.

The invention is inclusive of combinations of the aspects described herein. References to "a particular aspect" and the like refer to features that are present in at least one aspect of the invention. Separate references to "an aspect" (or "embodiment") or "particular aspects" or the like do not necessarily refer to the same aspect or aspects; however, such aspects are not mutually exclusive, unless so indicated or as are readily apparent to one of skill in the art. The use of singular or plural in referring to "method" or "methods" and the like is not limiting. The word "or" is used in this disclosure in a non-exclusive sense, unless otherwise explicitly noted.

The invention has been described in detail with particular reference to certain preferred aspects thereof, but it will be understood that variations, combinations, and modifications can be effected by a person of ordinary skill in the art within the spirit and scope of the invention.

The invention claimed is:

1. A method of communicating data, the method comprising:
   a) using a transmitter, transmitting a first modulated data signal corresponding to a first symbol stream;
   b) using a transceiver, backscatter-modulating the first modulated data signal according to a second symbol stream to provide a second modulated data signal;
   c) receiving the second modulated data signal using a receiver; and
   d) using a first processor, automatically removing a self-interference signal comprising the first modulated data signal from the second modulated data signal, and demodulating the second modulated data signal using the first symbol stream to determine contents of the second symbol stream.

2. The method according to claim 1, further including performing the transmitting and receiving steps simultaneously.

3. The method according to claim 1, wherein the transmitter transmits the first modulated data signal to the transceiver over a wireless network.

4. The method according to claim 3, wherein said wireless network is a cellular network.

5. The method according to claim 1, wherein said transceiver uses a single antenna to receive said first modulated data signal and transmit said second modulated data signal to said receiver.

6. The method according to claim 1, further comprising: using a second processor, automatically demodulating the first modulated data signal to determine contents of the first symbol stream.

7. The method of claim 1, wherein said transmitter and said receiver are operatively connected to a basestation.

8. The method of claim 1, wherein said transceiver is operatively connected to a mobile device.

9. The method of claim 8, wherein said end-user device is a cellular phone.

10. A system for communicating data comprising:
   a) a base station including a transmitter, a receiver and a first processor, the transmitter configured to transmit a first modulated data signal corresponding to a first symbol stream, the receiver configured to receive a second modulated data signal, the first processor configured to remove a self-interference signal comprising the first modulated data signal from the second modulated data signal, and automatically demodulate the second modulated data signal using the first symbol stream to determine contents of a second symbol stream; and
   b) a transceiver configured to backscatter-modulate the first modulated data signal according to the second symbol stream to provide the second modulated data signal to the receiver.

11. The system of claim 10, wherein the basestation is configured to perform said transmitting and receiving simultaneously.

12. The system of claim 10, wherein the transmitter is configured to transmit said first modulated data signal over a wireless network.

13. The system of claim 12, wherein the transceiver is configured to transmit said second modulated data signal over said wireless network.

14. The system of claim 13, wherein said wireless network is a cellular network.

15. The system of claim 10, wherein said transceiver comprises a first antenna, said first antenna utilized by said transceiver to receive said first modulated data signal and transmit said second modulated data signal to said receiver.

16. The system of claim 10, wherein the transceiver is operatively connected to a second processor, the second processor configured to automatically demodulate the first modulated data signal to determine contents of the first symbol stream.

17. The system of claim 10, wherein said transceiver is operatively connected to a mobile device.

18. The system of claim 17, wherein said mobile device is a cellular phone.

* * * * *